United States Patent [19]

Smolenski et al.

[11] Patent Number: 4,769,057
[45] Date of Patent: Sep. 6, 1988

[54] FLUIDIZED BED CELLULATION PROCESS

[75] Inventors: Chester P. Smolenski, Murrysville; Neil Birks, Pittsburgh, both of Pa.

[73] Assignee: Pittsburgh Corning Corporation, Pittsburgh, Pa.

[21] Appl. No.: 48,656

[22] Filed: May 12, 1987

[51] Int. Cl.$^4$ .............................................. C03B 19/08
[52] U.S. Cl. ........................................ 65/21.3; 65/22; 431/3; 431/8
[58] Field of Search ................ 65/21.3, 21.4, 22; 431/3, 8

[56] References Cited

U.S. PATENT DOCUMENTS

| | | | |
|---|---|---|---|
| 2,691,248 | 10/1954 | Ford. | |
| 3,163,512 | 12/1964 | Schill et al. | 65/22 |
| 3,441,396 | 4/1969 | D'Eustachio | 65/22 |
| 3,532,480 | 10/1970 | D'Eustachio | 65/21.4 X |
| 4,059,423 | 11/1977 | De Vos et al. | 65/22 X |
| 4,081,259 | 3/1978 | Bassin et al. | 65/22 X |
| 4,161,389 | 7/1979 | Staffin et al. | 432/58 |
| 4,234,330 | 11/1980 | Taupin et al. | 65/22 X |
| 4,303,433 | 12/1981 | Torobin | 65/21.4 |
| 4,584,767 | 10/1985 | Hendricks | 264/7 |
| 4,643,753 | 2/1987 | Braun | 65/21.3 |

FOREIGN PATENT DOCUMENTS 457725 6/1949 Canada.
544007 7/1957 Canada.

*Primary Examiner*—Robert L. Lindsay
*Attorney, Agent, or Firm*—Stanley J. Price, Jr.

[57] ABSTRACT

Sintered particles of pulverulant glass and cellulating agent are coated with a parting agent and introduced into a fluidizing vessel. Gas is passed upwardly through the fluidizing vessel at a velocity sufficient to form a fluidized bed of these sintered particles within the fluidizing vessel. The gas and fluidized bed of sintered particles are heated within the fluidizing vessel to a cellulation temperature of the sintered particles to cause the sintered particles within the fluidized bed to form discrete cellular glass nodules of uniform size. The cellular glass nodules formed within the fluidized bed of sintered particles, having a density less than the density of the sintered particles, migrate to the top of the fluidized bed to float on the top surface of the fluidized bed. The discrete cellular glass nodules floating on the top surface of the fluidized bed are withdrawn from the fluidizing vessel.

13 Claims, 1 Drawing Sheet

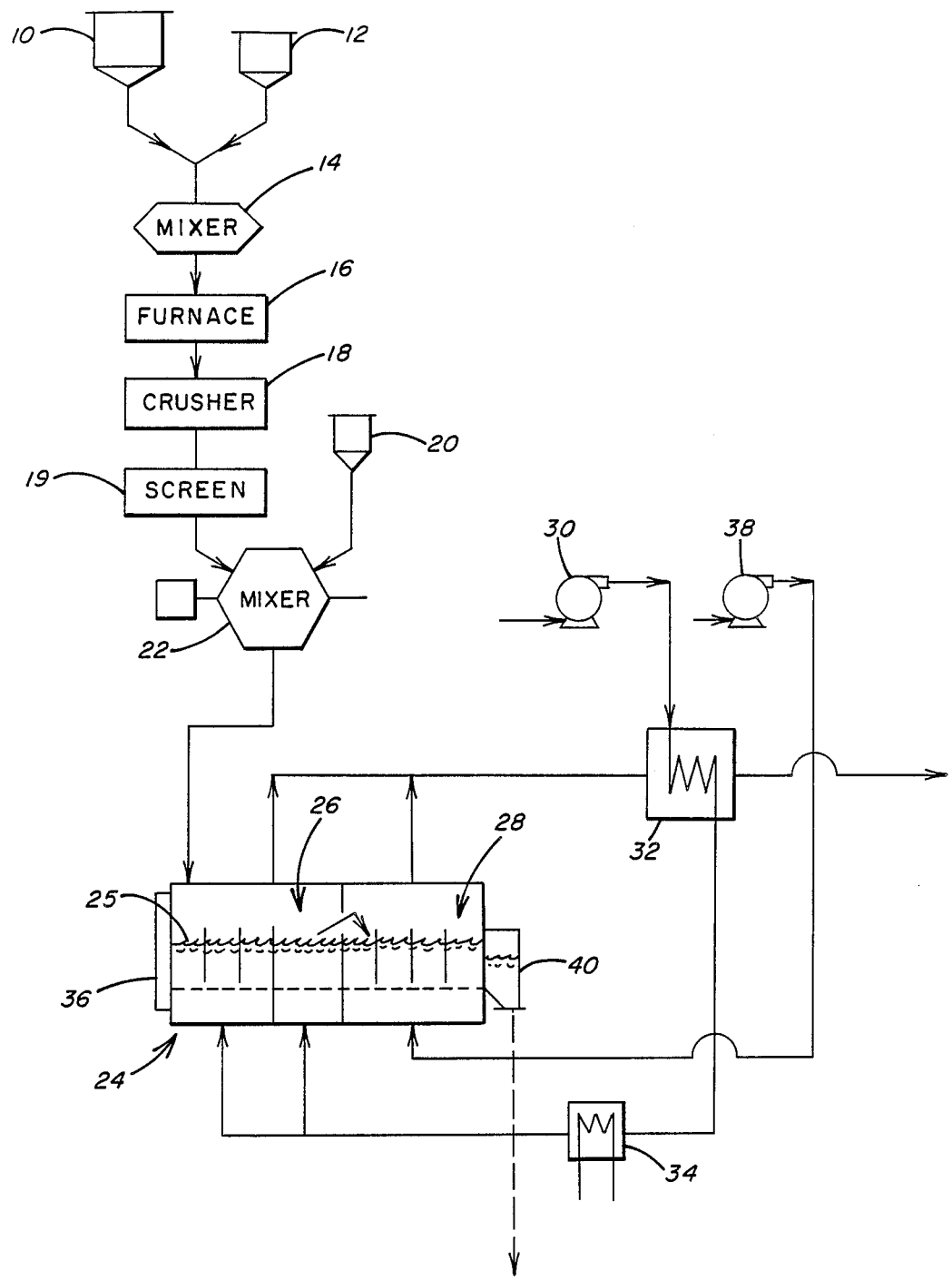

FLUIDIZED BED CELLULATION PROCESS

BACKGROUND OF THE INVENTION

1. Field of the Invention

This invention relates to a method for making cellular glass, and more particularly, to a method for forming a fluidized bed of sintered particles within a fluidizing vessel and heating the fluidized bed of sintered particles to a cellulation temperature to cellulate the sintered particles to form discrete cellular glass nodules.

2. Description of the Prior Art

The use of cellular glass as a thermal insulating material is well known. Cellular glass thermal insulation has many advantageous features when compared with other types of thermal insulation. Cellular glass is an inorganic closed cell, lightweight material that has a high resistance to fire, moisture, vermin and other objectionable agencies and has desirable insulating properties that make it particularly suitable for use as insulating material and other useful products.

U.S. Pat. No. 2,691,248 discloses a method for forming cellular glass nodules where pellets of crushed glass and cellulating agent are introduced into a furnace. The furnace includes a sintering zone and a cellulating zone. The pellets are first passed through the furnace sintering zone and heated to a temperature sufficient to sinter the pellets. The pellets continue through the furnace cellulating zone and are heated to a temperature sufficient to cellulate the sintered pellets. The furnace comprises a rotary kiln type so that the pellets are rolled about during processing to retain a relatively spherical shape. As an alternative method for forming cellular glass nodules, the pellets of crushed glass and cellulating agent are first introduced into a sintering furnace and therein heated to a temperature sufficient to cause the pellets of crushed glass and cellulating agent to soften and coalesce into a sintered mass. The sintered mass is removed from the sintering furnace and allowed to cool, and then crushed into sintered particles of preselected size. The sintered particles are conveyed to a rotary kiln cellulating furnace and therein heated to a temperature sufficient to cellulate the sintered particles.

U.S. Pat. No. 3,441,396 discloses a method for making cellular material wherein calcined partially cellulated nodules are crushed and mixed with carbon in a conventional ball mill. The mixture from the ball mill is thereafter introduced into a conventional furnace mold, and the mold is placed in a furnace. The mixture is heated within the furnace to form buns or blocks of cellular material. As an alternative, the mixture of calcined partially cellulated nodules that have been crushed and mixed with carbon may be pelletized in a conventional pelletizer and thereafter introduced into a rotary kiln furnace. The pellets are heated within the rotary kiln furnace to form cellular nodules. The cellular nodules are introduced into a cooling lehr and cooled without thermal shock.

U.S. Pat. No. 3,532,480 discloses a method for making cellular glass sheets wherein a mixture of glass forming material and cellulating agent are agglomerated into pellets and heated to an elevated temperature so that the pellets partially cellulate. The partially cellulated pellets are made to cohere to each other to form a sheet of coalesced, partially expanded pellets. The sheet of coalesced pellets is fed into a heating chamber wherein the sheet of coalesced, partially expanded pellets is further heated to a cellulation temperature to form a sheet of cellular glass. As the sheet of coalesced, partially expanded pellets is passed through the heating chamber during the cellulation process, it is supported either on the surface of a molten metal bath or on a nonadhering surface of an endless conveyor belt.

While it has been suggested by the prior art methods to utilize either a rotary kiln furnace or a furnace including a molten metal bath or endless conveyor belt system to heat pellets to a cellulation temperature to form cellular glass, there is a need for an improved cellulation process wherein a fluidized bed of sintered particles is heated to a sintered particle cellulation temperature to produce cellular glass nodules. The fluidized bed process must be capable of producing cellular glass nodules of uniform size and uniform cell structure. The temperature of the fluidized bed must be sufficient to cellulate the particles suspended in the fluidized bed.

SUMMARY OF THE INVENTION

In accordance with the present invention, there is provided a method for making cellular glass nodules that includes the stop of introducing sintered particles of pulverulent glass and cellulating agent coated with a parting agent into a fluidizing vessel. Hot gas is passed upwardly through the fluidizing vessel at a velocity sufficient to form a fluidized bed of these sintered particles within the fluidizing vessel.

Further in accordance with the present invention, there is provided a method for heating a fluidizing gas and a fluidized bed of sintered particles within a fluidizing vessel to a cellulation temperature of the sintered particles so that the sintered particles cellulate within the fluidizing vessel to form discrete cellular glass nodules of uniform size. The cellular glass nodules formed within the fluidized bed of sintered particles, having a density less than the density of the sintered particles, will migrate to the top of the fluidized bed of sintered particles and float on the top surface of the fluidized bed.

Additionally in accordance with the present invention, there is provided a method for cooling a fluidized bed of cellular glass nodules in a fluidizing vessel and withdrawing the cooled cellular glass nodules from the fluidizing vessel.

Accordingly, the principal object of the present invention is to provide a fluidized bed process for making cellular glass nodules wherein a fluidized bed of sintered particles is heated within a fluidizing vessel to a cellulation temperature of the sintered particles so that the sintered particles cellulate and form discrete cellular glass nodules of uniform size.

Another object of the present invention is to provide a method for cooling a fluidized bed of cellular glass nodules within a fluidizing vessel and withdrawing the cooled cellular glass nodules from the fluidizing vessel.

These and other objects of the present invention will be more completely disclosed and described in the following specification, the accompanying drawing and the appended claims.

BRIEF DESCRIPTION OF THE DRAWING

The drawing is a flow diagram illustrating a fluidized bed process for cellulating sintered particles of pulverulant glass and cellulating agent to form cellular glass nodules.

DESCRIPTION OF THE PREFERRED EMBODIMENTS

Referring to the drawing, there is illustrated an improved method for producing cellular glass nodules that includes the steps of first obtaining formulated glass particles, or other inorganic material suitable for cellulating, and a cellulating agent. Receiver 10 contains glass particles of preselected size. Receiver 12 contains a suitable cellulating agent, preferably a carbonaceous material such as lamp black, carbon black, silicon carbide or the like. The glass particles or other material from receiver 10 and the cellulating agent from receiver 12 are mixed in suitable proportions within mixer 14. The mixer 14 may be a conventional ball mixer or the like. The mixture of glass particles and cellulating agent formed in mixer 14 is placed in a suitable receiver and heated within furnace 16 to a preselected temperature sufficient to allow the glass particles or other material and cellulating agent to coalesce and sinter to form a sintered mass. The sintered mass is removed from furnace 16 and cooled. The cooled, sintered mass is introduced into crusher 18 and therein crushed to form sintered particles of pulverulent glass and cellulating agent. The sintered particles of pulverulent glass and cellulating agent are passed through screening device 19 to obtain a preferred size range of sintered particles that will pass through a 16 mess screen and be retained on a 50 mesh screen. It should be pointed out that although a preferred size range of sintered particles is herein specified, the operation of this invention is not limited to the cellulation of sintered particles falling within the preferred size range.

After screening, the sintered particles of pulverulent glass and cellulating agent are introduced into mixer 22. A limited amount of a parting agent, which is contained in receiver 20, is also introduced into mixer 22. Within mixer 22, the sintered particles are coated with the limited amount of parting agent. A preferred parting agent consists of alumina trihydrate but may also consist of any other suitable parting agent.

The instered particles with a coating of parting agent thereon are thereafter introduced into a fluidizing vessel generally designated by the numeral 24. Fluidizing vessel 24 includes a heating zone 26 and a cooling zone 28. A fluidized bed 25 of sintered particles is formed within heating zone 26 of fluidizing vessel 24 by passing a suitable fluidizing gas such as nitrogen upwardly through heating zone 26 at a velocity sufficient to suspend the sintered particles introduced into heating zone 26 in the upward gas flow. Blower 30 operates to introduce the fluidizing gas into the bottom of fluidizing vessel 24 heating zone 26 at a velocity within the range of between 45 to 285 feet per minute.

In order to cellulate the sintered particles introduced into heating zone 26 of fluidizing vessel 24, the fluidized bed 25 of sintered particles must be heated within heating zone 26 to a cellulation temperature of the sintered particles, which falls within the temperature range of between 1500° F. to 1600° F. It should be understood that although a cellulation temperature range of between 1500° to 1600° F. is specified herein, the cellulation temperature range may vary depending upon the specific composition of the pulverulent glass subjected to this fluidized bed cellulation process. In order to attain a sintered particle cellulation temperature range of between 1500° to 1600° F. within heating zone 26, a two-fold heating system is provided.

As seen in the drawing, a fluidizing gas heating system is utilized whereby the fluidizing gas provided by blower 30 is passed through heat exchanger 32 and preheater 34 before being introduced into the bottom of heating zone 26. As the fluidizing gas is passed through heat exchanger 32, it is heated by gas which has been discharged from fluidizing vessel 24. The fluidizing gas is heated within heat exchanger 32 so that the temperature of the fluidizing gas exiting heat exchanger 32 falls within the range of between 400° F. to 600° F. After the fluidizing gas is passed through heat exchanger 32, it is next passed through preheater 34. Preheater 34 can be either of the conventional electric or gas variety. Preheater 34 elevates the temperature of the fluidizing gas previously heated by heat exchanger 32 to a temperature within the range of between 1200° F. to 1400° F. After the fluidizing gas is passed through preheater 34, it is introduced into the bottom of heating zone 26. As previously described, as the fluidizing gas passes upwardly through heating zone 26, the sintered particles introduced into heating zone 26 are suspended in the upward gas flow to form a fluidized bed 25 of sintered particles. The fluidized bed 25 of sintered particles is heated by the fluidizing gas as the fluidizing gas passes upwardly through heating zone 26. The fluidized bed 25 of sintered particles is heated by the fluidizing gas to a temperature falling within the range of between 800° F. to 1000° F. Although the drawing shows the gas discharged from fluidizing vessel 24 as vented after passing through heat exchanger 32, the discharged gas may, if desired, be suitably filtered and recirculated.

As seen, the temperature of the fluidizing gas introduced into the bottom of heating zone 26 is less than a cellulation temperature of the sintered particles. External heating is provided to increase the temperature of the fluidizing gas and the fluidized bed 25 of sintered particles within heating zone 26 to a cellulation temperature of the sintered particles. An annular heating element, schematically illustrated in the drawing and designated by the numeral 36, heats the outer walls of fluidizing vessel 24 around heating zone 26. The heat produced by annular heating element 36 is transferred from the outer walls of fluidizing vessel 24 to the fluidizing gas and fluidized bed 25 of sintered particles within heating zone 26. Annular heating element 36 may consist of a series of radiant heaters, heating bars or the like. The heat produced by external heating element 36 heats the outer walls of fluidizing vessel 24 and heating zone 26 to thus increase the temperature of the fluidizing gas and fluidized bed 25 of sintered particles to a temperature sufficient to cause cellulation. As previously stated, the cellulation temperature of the sintered particles falls within a temperature range of between 1500° F. to 1600° F. The heat produced by annular heating element 36 is controlled to provide that the temperature of the fluidized bed 25 of sintered particles passing through heating zone 26 falls within this cellulation temperature range.

As the fluidized bed 25 of sintered particles is heated within heating zone 26 to a cellulation temperature of the sintered particles, the sintered particles cellulate to form discrete, expanded cellular glass nodules of uniform size. The size of the cellular glass nodules formed within heating zone 26 is controlled by the size of the sintered particles passed through screening device 19 and introduced into heating zone 26. As the sintered particles cellulate, there is a progressive decrease in particle density. Sintered particles having an initial desity within the range of between 50 to 60 PCF achieve a final density within the range of between 10 to 25 PCF after cellulation occurs. As seen, the cellular glass nodules formed have a density less than the density of the sintered particles. As a result, as the sintered particles cellulate and form cellular glass nodules, the cellular glass nodules migrate to the top of the fluidized bed 25 of sintered particles and the cellular glass nodules float on the top surface of fluidized bed 25.

The residence time of the sintered particles within heating zone 26 for desired cellulation depends upon the size of the sintered particles introduced into heating zone 26. As the size of the sintered particles increases, the residence time of the sintered particles within heating zone 26 also increases. It has been found that a temperature of between 1500° F. and 1600° F. in the fluidized bed 25, and a preferred particle size range previously stated, the sintered particles will require a residence time of between 10 to 15 minutes for complete cellulation to occur.

As the sintered particles cellulate to form expanded, discrete cellular glass nodules, the cellular glass nodules floating on the top surface of the fluidized bed 25 of sintered particles and cellular glass nodules pass from heating zone 26 to cooling zone 28. A fluidized bed of cellular glass nodules is formed within cooling zone 28 by passing a suitable fluidizing gas such as nitrogen upwardly through fluidizing vessel 24 cooling zone 28 at a velocity sufficient to suspend the cellular glass nodules introduced into cooling zone 28 in the upward gas flow. Blower 38 operates to introduce fluidizing gas into the bottom of cooling zone 28 at a velocity within the range of between 45 to 285 feet per minute. The cellular glass nodules are cooled within cooling zone 28 by the fluidizing gas in such a manner to prevent thermal shock.

With the above described process, sintered particles of pulerulant glass and cellulating agent introduced into heating zone 26 of fluidizing vessel 24 form a fluidized bed 25 of sintered particles by passing a fluidizing gas upwardly through heating zone 26 to suspend the sintered particles in the upward gas flow. As the fluidized bed 25 of sintered particles is heated within heating zone 26 to a cellulation temperature of the sintered particles, the sintered particles cellulate to form discrete cellular glass nodules of uniform size. Since the cellular glass nodules have a density less than the density of the sintered particles, the cellular glass nodules rise to the top of fluidized bed 25 and float on the top surface of fluidized bed 25. The cellular glass nodules formed within heating zone 26 pass through fluidizing vessel cooling zone 28. A fluidized bed of cellular glass nodules is formed within cooling zone 28 by passing a fluidizing gas upwardly through cooling zone 28 at a velocity sufficient to suspend the cellular glass nodules in the upward gas flow. Within cooling zone 28, the nodules are cooled by the fluidizing gas. The cooled cellular glass nodules are withdrawn from cooling zone 28 through discharge chute 40.

It should be pointed out that this invention is not limited to cellulating only previously sintered particles within fluidizing vessel 24. Where desired, both the sintering and cellulation process may be performed within fluidizing vessel 24. If desired, agglomerated pellets of uncellulated glass and cellulating agent coated with a suitable parting agent may be introduced into heating zone 26 of fluidizing vessel 24. Within heating zone 26, these agglomerated pellets may be sintered and then cellulated to form cellular glass nodules.

The following examples are illustrative of the instant invention.

EXAMPLE 1

Sintered particles of pulverulent glass and cellulating agent were passed through a screening device to obtain a preferred size range of sintered particles that would pass through a 16 mesh screen and be retained on a 30 mesh screen. The sintered particles passed through the screening device were coated with an alumina trihydrate parting agent. The total weight of the coated, sintered particles was approximately 450 grams, of which approximately 38.3 grams constituted the total weight of the parting agent.

The coated, sintered particles were introduced into a fluidizing vessel. The fluidizing vessel was a bench model of the fluidizing vessel to be used in this invention. As the coated, sintered particles were introduced into the fluidizing vessel, a fluidizing gas was introduced into the bottom of the fluidizing vessel at a rate of 100 feet per minute. Although nitrogen was used as the fluidizing gas in this example, it should be understood that other types of fluidizing gasses may be used with similar results. As the fluidizing gas passed upwardly through the fluidizing vessel, the sintered particles were suspended in the upward gas flow to form a fluidized bed of sintered particles within the fluidizing vessel. The temperature of the fluidized bed was set at 1500° F. Sampling of the sintered particles within the fluidized bed began when the fluidized bed temperature reached 1400° F., and sampling took place every five minutes thereafter. Sequential sample density measurements revealed a progressive bulk density decrease in the sintered particles as the sintered particles began to cellulate. Sintered particles having a density of approximately 50.3 PCF before cellulation began achieved a minimum density of 16.05 PCF after total cellulation occurred. The total residence time of the sintered particles within the fluidizing vessel was approximately 30 minutes. There was no evidence of particle agglomeration or internal sticking to the fluidizing vessel walls. The sintered particles introduced into the fluidizing vessel cellulated to form approximately spherical cellular glass nodules.

EXAMPLE 2

Example 1 was repeated with the fluidized bed temperature raised to 1556° F. In this test sampling began when the fluidized bed temperature reached 1500° F. and continued every five minutes thereafter. Upon complete cellulation of the sintered particles, the minimum density achieved was 15.35 PCF. Results similar to Example 1 were obtained, with the exception of very slight internal sticking of the particles to the fluidizing vessel walls.

EXAMPLE 3

Example 1 was repeated using fly ash as a parting agent, and the fluidized bed temperature set at 1535° F. Sticking occurred among the sintered particles in the fluidized bed. Also, the sintered particles adhered to the fluidizing vessel inner walls. Because of the sticking which occurred in the fluidized bed, a size and density analysis was not able to be completed.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

I claim:

1. A method for making cellular glass nodules comprising the steps of,
   forming discrete agglomerated pellets from a mixture of uncellulated glass and a cellulating agent,
   coating said discrete agglomerated pellets of uncellulated glass and cellulating agent with a parting agent forming coated discrete agglomerated pellets,
   introducing said coated agglomerated pellets of uncellulated glass and cellulating agent into a fluidizing vessel,
   passing hot gas upwardly through said fluidizing vessel at a sufficient velocity to form a fluidized bed of said discrete coated agglomerated pellets within said vessel,
   heating said hot gas and fluidized bed of discrete agglomerated pellets within said fluidizing vessel to a cellulating temperature of said pellets so that said discrete agglomerated pellets cellulate within said fluidizing vessel to form discrete cellular glass nodules of uniform size, said cellular glass nodules having a density less than the density of said agglomerated pellets, said discrete cellular glass nodules rising to the top of said fluidized bed and floating on the top surface of said fluidized bed of discrete coated agglomerated pellets, and
   withdrawing said discrete cellular glass nodules floating on said top surface of said fluidized bed from said fluidizing vessel.

2. A method for making cellular glass nodules as set forth in claim 1 which includes,
   cooling said discrete cellular glass nodules to a preselected temperature.

3. A method for making cellular glass nodules as set forth in claim 1 which includes,
   cooling said discrete cellular glass nodules formed within said fluidizing vessel before said cellular glass nodules are withdrawn from said fluidizing vessel.

4. A method for making cellular glass nodules as set forth in claim 1 which includes,
   controlling the size of said discrete cellular glass nodules formed within said fluidizing vessel by controlling the size of said discrete agglomerated pellets of uncellulated glass and cellulating agent introduced into said fluidizing vessel.

5. A method for making cellular glass nodules as set forth in claim 1 which includes,
   providing said fluidizing vessel with external heating means to heat said hot gas and fluidized bed of discrete agglomerated pellets within said vessel to a discrete agglomerated pellet cellulating temperature.

6. A method for making cellular glass nodules comprising the steps of,
   providing discrete uncellulated sintered particles of a mixture of pulverulent glass and a cellulating agent,
   coating said uncellulated discrete sintered particles of pulverulent glass and cellulating agent with a parting agent and forming coated discrete sintered particles,
   introducing said coated discrete sintered particles of pulverulent glass and cellulating agent into a fluidizing vessel,
   passing hot gas upwardly through said fluidizing vessel at a sufficient velocity to form a fluidized bed of said coated discrete sintered particles within said vessel,
   heating said hot gas and fluidized bed of coated discrete sintered particles within said vessel to a cellulating temperature of said coated sintered particles so that said coated discrete sintered particles cellulate within said vessel to form discrete cellular glass nodules of uniform size, said cellular glass nodules having a density less than the density of said sintered particles, said cellular glass nodules rising to the top of said fluidized bed and floating on the top surface of said fluidized bed, and
   withdrawing said discrete cellular glass nodules floating on said top surface of said fluidized bed from said fluidizing vessel.

7. A method for making cellular glass nodules as set forth in claim 6 which includes the further steps of,
   forming a mixture of glass particles and cellulating agent,
   heating said mixture to a preselected temperature so that said mixture of glass particles and cellulating agent coalesce and sinter to form a sintered mass,
   cooling said sintered mass, and
   crushing said sintered mass into discrete sintered particles of pulverulent glass and cellulating agent.

8. A method for making cellular glass nodules as set forth in claim 7 which includes,
   heating said mixture of glass particles and cellulating agent to a temperature less than the cellulating temperature of said mixture.

9. A method for making cellular glass nodules as set forth in claim 6 which includes,
   cooling said discrete cellular glass nodules withdrawn from said fluidizing vessel to a preselected temperature.

10. A method for making cellular glass nodules as set forth in claim 6 which includes,
    cooling said discrete cellular glass nodules formed within said fluidizing vessel before said cellular glass nodules are withdrawn from said fluidizing vessel.

11. A method for making cellular glass nodules as set forth in claim 6 which includes,
    sizing said discrete sintered particles of pulverulent glass and a cellulating agent to a preferred size consist before introducing said discrete sintered particles into said fluidizing vessel.

12. A method for making cellular glass nodules as forth in claim 6 which includes,
    providing said fluidizing vessel with external heating means to heat said hot gas and fluidized bed of sintered particles within said fluidizing vessel to a sintered particle cellulating temperature.

13. A method for making cellular glass nodules comprising the steps of,
    providing discrete sintered particles of pulverulent glass and a cellulating agent,
    sizing said discrete sintered particles of pulverulent glass and cellulating agent to a preferred size consist, coating said discrete sized sintered particles of pulverent glass and cellulating agent with a parting agent and forming coated discrete sized sintered particles, introducing said coated discrete sintered particles into a fluidizing vessel, passing hot gas upwardly through said fluidizing vessel at a sufficient velocity to form a fluidized bed of said coated discrete sintered particles within said fluidizing vessel, heating said hot gas and fluidized bed of sintered particles within said fluidizing vessel to a cellulating temperature of said coated discrete sintered particles so that said coated discrete sintered particles cellulate within said fluidizing vessel to form discrete cellular glass nodules of uniform size, said cellular glass nodules having a density less than the density of said sintered particles, said cellular glass nodules rising to the top of said fluidized bed and on the top surface of said fluidized bed, forming a fluidized bed of cellular glass nodules within said fluidizing vessel, cooling said discrete cellular glass nodules within said fluidizing vessel, and withdrawing said cooled discrete cellular glass nodules from said fluidizing vessel.

* * * * *